United States Patent
Li et al.

(10) Patent No.: US 11,503,583 B2
(45) Date of Patent: Nov. 15, 2022

(54) COMMUNICATION METHOD AND APPARATUS AND COMMUNICATION SYSTEM

(71) Applicant: FUJITSU LIMITED, Kawasaki (JP)

(72) Inventors: Guorong Li, Beijing (CN); Pengyu Ji, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 27 days.

(21) Appl. No.: 17/141,975

(22) Filed: Jan. 5, 2021

(65) Prior Publication Data
US 2021/0127372 A1  Apr. 29, 2021

Related U.S. Application Data

(63) Continuation of application No. PCT/CN2018/100098, filed on Aug. 10, 2018.

(51) Int. Cl.
*H04W 72/04* (2009.01)
*H04W 4/44* (2018.01)
*H04L 5/00* (2006.01)

(52) U.S. Cl.
CPC ......... *H04W 72/042* (2013.01); *H04L 5/0053* (2013.01); *H04L 5/0094* (2013.01); *H04W 4/44* (2018.02); *H04W 72/0453* (2013.01)

(58) Field of Classification Search
CPC . H04W 72/042; H04W 4/44; H04W 72/0453; H04L 5/0053; H04L 5/0094
See application file for complete search history.

(56) References Cited

U.S. PATENT DOCUMENTS

2020/0275303 A1* 8/2020 Mok ............... H04L 1/08
2021/0127362 A1* 4/2021 Jin ................ H04W 4/40

FOREIGN PATENT DOCUMENTS

| GN | 105282257 A | 1/2016 |
| GN | 106470383 A | 3/2017 |

(Continued)

OTHER PUBLICATIONS

International Search Report and Written Opinions of the International Searching Authority issued by the National Intellectual Property Administration, PRC, for corresponding International Patent Application No. PCT/CN2018/100098, dated May 13, 2019, with an English translation.

(Continued)

*Primary Examiner* — Ronald B Abelson
(74) *Attorney, Agent, or Firm* — Myers Wolin, LLC

(57) ABSTRACT

A communication method and apparatus and a communication system, the communication apparatus being provided in a terminal equipment, and the communication apparatus comprising: processing circuitry configured to acquire or select communication resources determined based on a mapping between vehicle-to-everything (V2X) services and communication resource parameters; and communication circuitry configured to transmit target V2X services by using the communication resources. The communication resources may be determined according to the mapping between vehicle-to-everything (V2X) services and communication resource parameters. Certain embodiments making the communication resources meet requirements of the V2X services.

17 Claims, 13 Drawing Sheets

(56) References Cited

FOREIGN PATENT DOCUMENTS

WO        2010/138921 A2    12/2010
WO        2017/129075 A1     8/2017

OTHER PUBLICATIONS

Notice of Reasons for Refusal issued by the Japan Patent Office for corresponding Japanese Patent Application No. 2021-500452, dated Apr. 5, 2022, with an English translation.
Ericsson, "TX Profiles Provisioning", Agenda Item: 9.10.2, 3GPP TSG-RAN WG2 Meeting #103, TDoc R2-1812365, Gothenburg, Sweden, Aug. 20-24, 2018.
Huawei et al., "Discussion on the TX carrier selection for PC5 CA", Agenda Item: 9.10.2, 3GPP TSG-RAN WG2 Meeting #99bis, R2-1710085, Prague, Czech Republic, Oct. 9-13, 2017.
Motorola Mobility et al., "Solution to Key Issue #2 —Supporting multiple V2X applications requiring different operating carrier frequency (for V2X over PC5) or RAT type (for V2X over Uu)", Agenda Item: 6.6, 3GPP TSG SA WG2 Meeting #128, S2-186760 (revision of S2-) Vilnius, Lithuania, Jul. 2-6, 2018.
Ericsson, "Sidelink Carrier Selection Criteria forTX", Agenda Item: 9.10.2.1, 3GPP TSG-RAN WG2 Meeting #101-Bis, Tdoc R2-1805741, Sanya, China, Apr. 16-20, 2018.
ZTE, "Discussion on LCP procedure for PC5 CA", Agenda Item: 9.10.2.2, 3GPP TSG-RAN WG2 Meeting #101 bis, R2-1804509, Sanya, China, Apr. 16-20, 2018.

* cited by examiner

COMMUNICATION METHOD AND APPARATUS AND COMMUNICATION SYSTEM

CROSS-REFERENCE TO RELATED APPLICATION

This application is a continuation application of International Application PCT/CN2018/100098 filed on Aug. 10, 2018 and designated the U.S., the entire contents of which are incorporated herein by reference.

FIELD

This disclosure relates to the field of communication technologies, and in particular to a communication method and apparatus and a communication system.

BACKGROUND

Vehicle communication services are called V2X services. V2X services may include multiple types, such as vehicle-to-vehicle (V2V) services, vehicle-to-infrastructure (V2I) services, and vehicle-to-pedestrian (V2P) services.

V2X services may be provided via a PC5 interface and/or a Uu interface. V2X services transmitted via a PC5 interface may be provided by V2X sidelink communication. The V2X sidelink communication is a communication mode in which terminal equipments may directly communicate with each other via a PC5 interface.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors of this disclosure that on the one hand, in the existing Long Term Evolution (LTE), a subcarrier spacing (SCS) of each carrier is fixed at 15 k, and in V2X sidelink communication of LTE, in PC5 interface communication, a transmission time interval (TTI) is one subframe, i.e. 1 ms. As short TTI is not supported currently, current LTE V2X sidelink communication is difficult to apply to V2X services having different requirements, such as V2X services with an ultra-low latency requirement; and on the other hand, in a Uu interface of New Radio (NR), there may be more than one SCSs on each carrier, such as 15 k, 30 k, and 60 k, and NR Supports slot-based and non-slot-based transmission, furthermore, it also supports BWP (Bandwidth part) operations in a carrier of a large bandwidth, so that user equipments with different radio frequency capabilities may perform reception and transmission on BWPs with different bandwidths in the carrier. In addition, different BWPs may be configured to use different SCSs to serve for services having different requirements on quality of service (QoS).

In future V2X sidelink communication of NR, operations of more than one communication resource parameters of an air interface in the NR may be used to support different NR V2X service types; the communication resource parameters may be SCSs and/or time lengths and/or BWPs. Therefore, how to apply more than one communication resource parameters in the NR to serve for V2X services having different requirements has become a problem needing to be solved.

Embodiments of this disclosure provide a communication method and apparatus and a communication system, in which communication resources may be determined according to a mapping between vehicle-to-everything (V2X) services and communication resource parameters, thereby making the communication resources meet requirements of the V2X services.

According to a first aspect of the embodiments of this disclosure, there is provided a communication apparatus, provided in a terminal equipment, the communication apparatus including: a first obtaining unit configure to acquire or select communication resources determined based on a mapping between vehicle-to-everything (V2X) services and communication resource parameters; and a communication unit configure to transmit target V2X services by using the communication resources.

According to a second aspect of the embodiments of this disclosure, there is provided a communication apparatus, provided in a network device, the communication apparatus including: a second obtaining unit configure to acquire or determine a mapping between vehicle-to-everything (V2X) services and communication resource parameters.

According to a third aspect of the embodiments of this disclosure, there is provided a communication system, including a terminal equipment and a network device, the terminal equipment including the communication apparatus as described in the first aspect, and the network device including the communication apparatus as described in the second aspect.

An advantage of the embodiments of this disclosure exists in that suitable communication resources are selected according to characteristics of V2X services, so that the communication resources meet requirements of the V2X services, such as reducing transmission latency of the V2X services, and improving reliability of transmission of V2X services. Moreover, the method in this disclosure is less complicated to implement, and is easy to be carried out in communication products.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
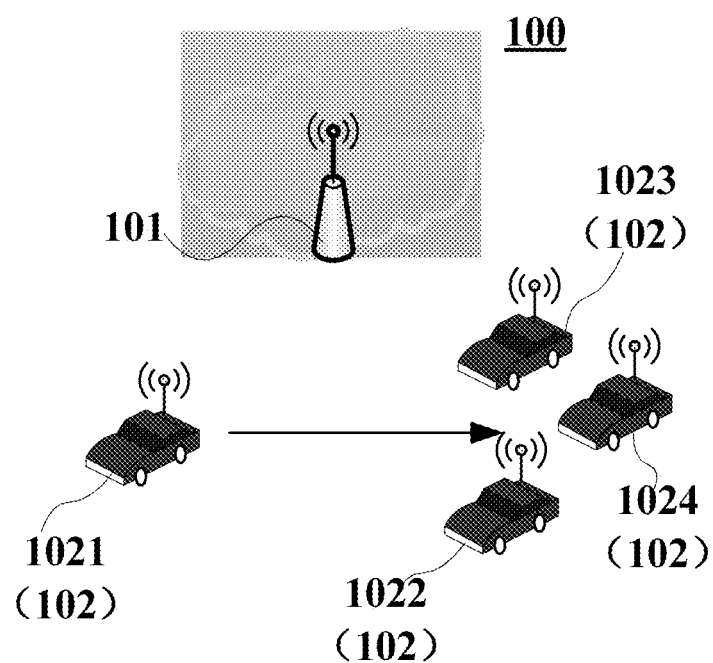
FIG. 1 is a schematic diagram of a communication system of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and multiple terminal equipments 102, the multiple terminal equipments 102 being, for example, a terminal equipment 1021, a terminal equipment 1022, a terminal equipment 1023, and a terminal equipment 1024.

In the embodiment of this disclosure, existing services or services that may be implemented in the future may be performed between the network device 101 and the terminal equipments 102. For example, such services may include but not limited to enhanced mobile broadband (eMBB), massive machine type communication (MTC), and ultra-reliable and low-latency communication (URLLC), etc.

The terminal equipments 102 may transmit data to the network device 101 and receive feedback information from the network device 101. The network device 101 may transmit data to one or more terminal equipments 102, and receive feedback transmitted by the terminal equipments 102.

Furthermore, the terminal equipments 102 may transmit information on V2X services to other terminal equipments 102, or the terminal equipments 102 may receive information on V2X services from other terminal equipments 102. For example, the terminal equipment 1021 transmits information on V2X services to terminal equipment 1022, or the terminal equipment 1021 receives information on V2X services to terminal equipment 1022.

Following description shall be given by taking a network device in a communication system as a transmitter end and a terminal equipment therein as a receiver end as examples. However, this disclosure is not limited thereto, and the transmitter end and/or the receiver end may also be other devices. For example, this disclosure is applicable not only to signal transmission between a network device and a terminal equipment, but also to signal transmission between two terminal equipments.

Embodiment 1

The embodiment of this disclosure provides a communication method, which is carried out by a terminal equipment.

Figure 2:
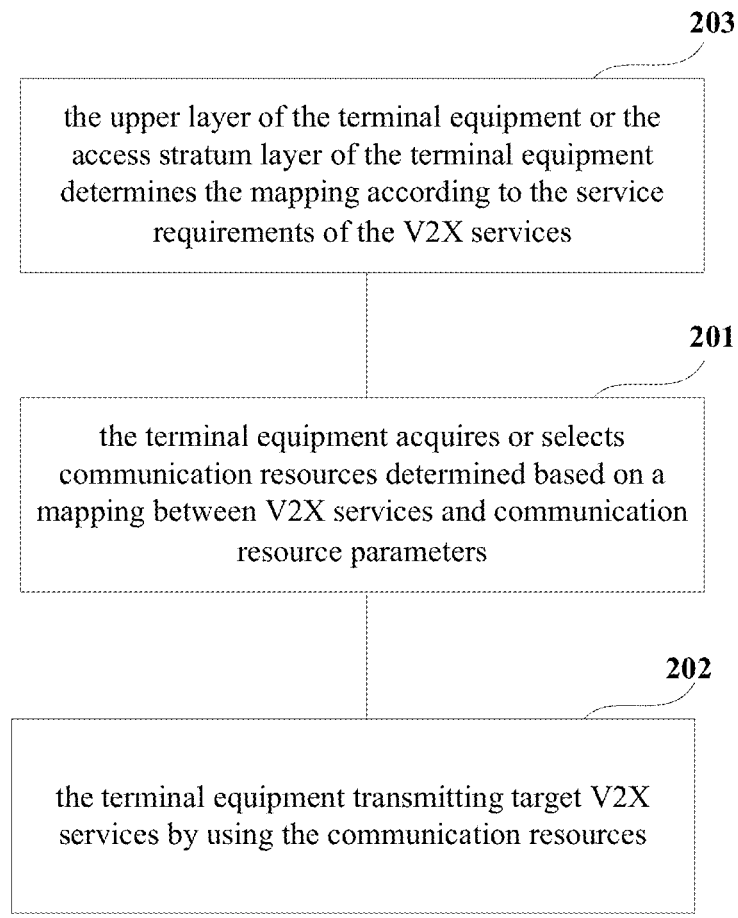
FIG. 2 is a schematic diagram of the communication method of Embodiment 1 of this disclosure.

FIG. 2 is a schematic diagram of the communication method of the embodiment of this disclosure. As shown in FIG. 2, the method includes:

step 201: the terminal equipment acquires or selects communication resources determined based on a mapping between vehicle-to-everything (V2X) services and communication resource parameters; and step 202: the terminal equipment transmitting target V2X services by using the communication resources.

In this embodiment, the communication resources of the terminal equipment are determined according to the mapping between the vehicle communication (V2X) services and the communication resource parameters, so that the communication resources may meet demands of the V2X services.

In this embodiment, the communication resource parameters may be parameters used to describe characteristics of the communication resources, and different communication resources may be distinguished according to the parameters. For example, the communication resource parameters may include at least one of the following: a subcarrier spacing (SCS), a transmission time length of a transport block, and information on a bandwidth part (BWP).

In this embodiment, the V2X services may include: service types of the V2X services, and/or service attributes of the V2X services. And the mapping between V2X services and communication resource parameters may include: a mapping between service types of the V2X services and the communication resource parameters, and/or a mapping between service attributes of the V2X services and the communication resource parameters.

In this embodiment, the service types of the V2X services may include at least one of the following listed types: safety services or non-safety services, periodic messages or event-triggered messages, and common awareness messages (CAMs) or decentralized environmental notification messages (DENMs) or basic safety messages (BSMs). That is, from the perspective of safety, the service types of V2X services may be divided into security services and non-security services; from the perspective of transmission frequency, the service types of V2X services may be divided into periodic triggering messages and event-triggered messages; and from the perspective of service contents, the services types of the V2X services may be divided into CAM, DENM and BSM messages.

In this embodiment, the service attributes of the V2X services are at least one of the following listed attributes: priorities of the V2X services, such as ProSe Per-Packet priorities (PPPPs), or a set of PPPPs; reliabilities of the V2X services, such as Per-Packet reliabilities (PPPRs), or a set of PPPRs, or a correct transmission ratio; rates of the V2X services, such as guaranteed bit rates (GBRs); latency of the V2X services, such as latency of packets; and service quality grades of the V2X services, such as grade indices of quality of service (QoS) of the V2X services, the grade indices of quality of service (QoS) of the V2X services corresponding to a series of quality of service (QoS) parameters, such as priority, and/or latency, and/or an error ratio, and/or a rate.

Figure 3:
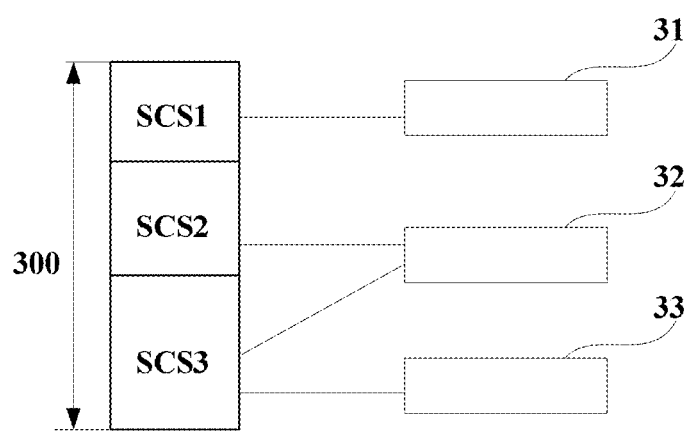
FIG. 3 is a schematic diagram of the mapping between V2X services and communication resource parameters of Embodiment 1 of this disclosure.

FIG. 3 is a schematic diagram of the mapping between V2X services and communication resource parameters of Embodiment 1 of this disclosure. As shown in FIG. 3, there exist more than one SCSs on a wide carrier 300, i.e. SCS1, SCS2, and SCS3, and there exists mapping between V2X services 31, 32, 33 and the more than one SCSs, for example, one V2X service may be mapped to one or more SCSs. Likewise, there may exist similar mapping between the V2X services and slot-based or non-slot-based transmission, and there may exist similar mapping between the V2X services and BWP information.

In one implementation of step 201 of this embodiment, the terminal equipment may be allocated with the communication resources by the network device, so that the terminal equipment may acquire the communication resources. In the following description, this implementation is referred to as a first mode. In another implementation of step 201 in this embodiment, the terminal equipment may select communication resources in a resource pool, the communication pool may be pre-configured, or may be configured by the network device. In the following description, this implementation is referred to as a second mode.

In this embodiment, the mapping between V2X services and communication resource parameters may be determined by the terminal equipment, in which case the terminal equipment may obtain or select the communication resources in the above first mode or second mode. The mapping between V2X services and communication resource parameters may be determined by the terminal equipment may be that: the mapping between V2X services and communication resource parameters is determined by a high layer of the terminal equipment, or the mapping between V2X services and communication resource parameters is determined by an access stratum layer (AS layer) of the terminal equipment. The high layer of the terminal equipment may be a V2X application layer or a non-access stratum layer (NAS layer).

Figure 4:
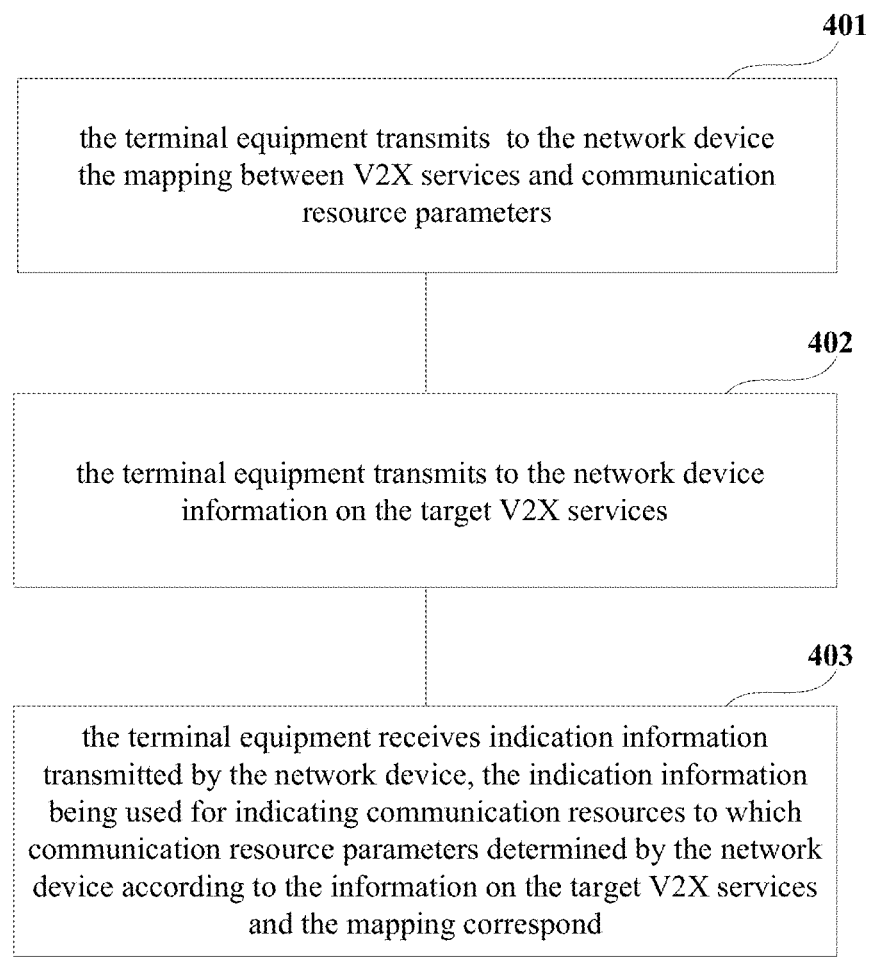
FIG. 4 is a schematic diagram of a method for acquiring communication resources by the terminal equipment in a first mode of Embodiment 1 of this disclosure.

FIG. 4 is a schematic diagram of a method for acquiring the communication resources by the terminal equipment in the first mode. As shown in FIG. 4, the method includes:

step 401: the terminal equipment transmits to the network device the mapping between V2X services and communication resource parameters;

step 402: the terminal equipment transmits to the network device information on the target V2X services; and step 403: the terminal equipment receives indication information transmitted by the network device, the indication information being used for indicating communication resources to which communication resource parameters determined by the network device according to the information on the target V2X services and the mapping correspond.

In step 401 of this embodiment, the terminal equipment may transmit to the network device the mapping relationship between the V2X services and the communication resource parameters in a radio resource control (RRC) message, the radio resource control (RRC) message being, for example, a sidelink user equipment information (sidelink UE information) message.

In step 402 of this embodiment, the terminal equipment may transmit to the network device information on the target V2X services. The information may be used to indicate service types and/or service attributes of the target V2X services; for example, the information on the target V2X services may be a destination index, which may indicate the service types of the target V2X services. And for another example, the information on the target V2X services may be a logical channel group (LCG) identifier, which may indicate service attributes of the target V2X services.

In this embodiment, the terminal equipment may, for example, transmit to the network device the information on the target V2X services via a sidelink buffer status report (sidelink BSR).

In step 403 of this embodiment, the terminal equipment receives the indication information transmitted by the network device, the indication information indicating to the terminal equipment the communication resources allocated by the network device for the terminal equipment. The communication resources correspond to the communication resource parameters, and the communication resource parameters may be communication resource parameters determined by the network device according to the information on the target V2X services and the above mapping. And the indication information may be, for example, sidelink grants (SL grants) information.

In this embodiment, when the user equipment has a new target V2X service to be transmitted, step 402 may be directly executed. It is not necessary to execute step 401 before each time of executing step 402. For example, if the network device stores the mapping transmitted by the terminal equipment and the mapping is not updated, step 401 may be omitted, or step 401 may be periodically or aperiodically executed.

Figure 5:
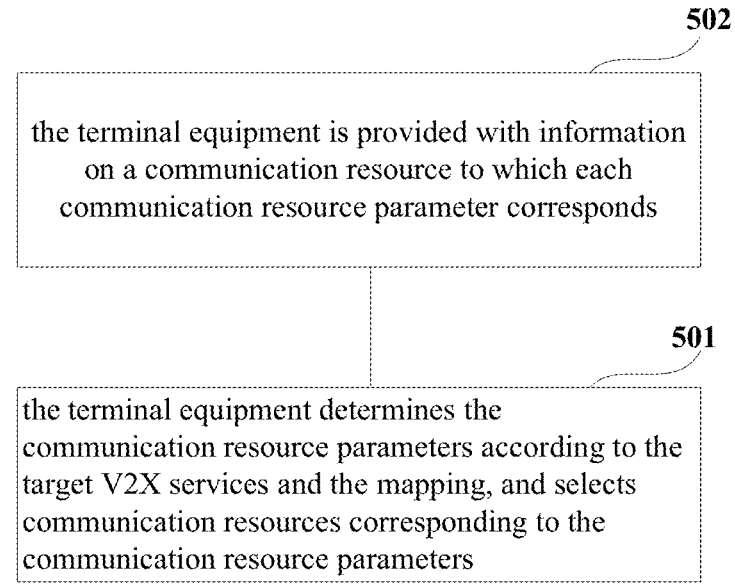
FIG. 5 is a schematic diagram of the method for acquiring communication resources by the terminal equipment in a second mode of Embodiment 1 of this disclosure.

FIG. 5 is a schematic diagram of a method for acquiring the communication resources by the terminal equipment in the second mode. As shown in FIG. 5, the method includes:

step 501: the terminal equipment determines the communication resource parameters according to the target V2X services and the mapping, and selects communication resources corresponding to the communication resource parameters.

In step 501 of this embodiment, for example, after selecting a carrier used for transmitting the target V2X services, according to mapping between the target V2X services and the communication resource parameters (such as SCSs), the terminal equipment may select SCSs adopted in transmission of the target V2X services, and transmit the target V2X services by using the communication resources to which the SCSs correspond. And furthermore, if the V2X services are mapped to more than one SCSs, the terminal equipment may further select one of the SCSs for the transmission, such as based on implementation of the terminal equipment, or by selecting a minimum SCS therein by the terminal equipment, or by selecting a maximum SCS therein by the terminal equipment, or selecting an SCS with a lowest channel occupancy ratio or an SCS lower than a threshold therein by the terminal equipment, or selecting an SCS with a maximum bandwidth therein by the terminal equipment, or selecting an SCS supporting slot-based or non-slot-based transmission therein by the terminal equipment.

In this embodiment, as shown in FIG. 5, the method may further include:

step 502: the terminal equipment is provided with information on a communication resource to which each communication resource parameter corresponds.

In step 502 of this embodiment, the information on a communication resource to which each communication resource parameter (such as an SCS) corresponds may include: a channel busy ratio (CBR) information (such as a CBR threshold to which each SCS corresponds) and/or information on a priority (such as a PPPP to which each SCS corresponds) and/or information on a reliability (such as a PPPR to which each SCS corresponds) and/or information on a rate (such as a GRB to which each SCS corresponds) and/or information on latency (such as latency to which each SCS corresponds) and/or information on QoS (such as a QoS parameter or a QoS index of a service to which each SCS corresponds), etc.

In this embodiment, when the terminal equipment is provided with the information on the communication resource to which each communication resource parameter (such as an SCS) corresponds in step 502, the terminal equipment may determine the communication resource parameters according to the target V2X services, the mapping and the provided information, and select the communication resources to which the communication resource parameters correspond, in step 501.

For example, if the terminal equipment is provided the channel busy ratio (CBR) information and/or priority information, such as a CBR-PPPP parameter to which each SCS corresponds, the terminal equipment selects a corresponding PPPP, and an SCS with a value of a measured CRB within a provided CRB threshold range or a value of a measured CRB lower than a provided CRB threshold, according to a PPPP and a measured CRB of a current V2X service.

For example, if the terminal equipment is provided with the reliability information, such as a PPPR threshold to which each SCS corresponds, the terminal equipment selects an SCS with a PPPR threshold higher than the PPPR of the V2X service according to the PPPR of the current V2X service.

For example, if the terminal equipment is provided with the rate information, such as a GBR upper limit to which each SCS corresponds, the terminal equipment selects an SCS with a GBR upper limit higher than a rate of the V2X service according to a rate required by the current V2X service.

For example, if the terminal equipment is provided with the latency information, such as latency to which each SCS corresponds, the terminal equipment selects an SCS with latency higher than latency of the V2X service according to the rate required by the current V2X service.

For example, if the terminal equipment is provided with the QoS information, such as a QoS parameter or a QoS index supported by each SCS, the terminal equipment selects an SCS matching the V2X QoS according to QoS required by the current V2X service.

In this embodiment, the above description of the information on the communication resource to which each communication resource parameter corresponds is given by taking that the communication resource parameter is an SCS as an example, and the above description is also applicable to a case where the communication resource parameter is the transmission time length or the BWP information.

In step 502 of this embodiment, the manner in which the terminal equipment is provided with the channel busy ratio (CBR) information and/or priority information of the communication resource to which each communication resource parameter corresponds may be any of the following that:

(1) for example, when the terminal equipment is in coverage and is in an RRC Connected mode, a SidelinkUE-Information message transmitted by the terminal equipment may include mapping between the V2X service types and the SCSs, and the network device may configure the channel busy ratio (CBR) information and/or priority information and/or reliability information and/or rate information and/or latency information and/or QoS information of the communication resource to which each SCS corresponds by using an RRC dedicated message, such as a CBR-PPPP parameter, and a PPPR parameter;

(2) for example, when the terminal equipment is in coverage and is in an RRC IDLE mode, the terminal equipment does not transmit an SidelinkUEInformation message, and may obtain the channel busy ratio (CBR) information and/or priority information and/or reliability information and/or rate information and/or latency information and/or QoS information of the communication resource to which each SCS corresponds, such as a CBR-PPPP parameter, and a PPPR parameter, from system information; and (3) for example, when the terminal equipment is out of coverage, the terminal equipment obtains the channel busy ratio (CBR) information and/or priority information and/or reliability information and/or rate information and/or latency information and/or QoS information of the communication resource to which each SCS corresponds, such as a CBR-PPPP parameter, and a PPPR parameter, etc., from pre-configuration.

In this embodiment, when the mapping between the V2X services and the communication resource parameters is determined by the high layer or the access stratum layer (AS layer) of the terminal equipment, as shown in FIG. 2, the method may further include:

step 203: the high layer of the terminal equipment or the access stratum layer of the terminal equipment determines the mapping according to the service requirements of the V2X services.

In this embodiment, in determining the mapping between the V2X services and the communication resource parameters, the mapping may be determined according to the V2X service requirements. For example, if the V2X services are latency-sensitive services, a higher SCS may be selected to correspond to them, and if the V2X services are latency-insensitive services, a lower SCS may be selected to correspond to them; for another example, if the V2X services are high-reliability services, a higher SCS may be selected to correspond to them, and if the V2X services are low-reliability services, a lower SCS may be selected to correspond to them; for a further example, if the V2X services are latency-sensitive services, a non-slot may be selected to correspond to them, and if the V2X services are latency-insensitive services, a slot may be selected to correspond to them; for yet another example, if the V2X services are latency-sensitive services, a BWP with a higher SCS may be selected to correspond to them, and if the V2X services are latency-insensitive services, a BWP with a lower SCS may be selected to correspond to them.

In this embodiment, before step 203, the terminal equipment may also be provided with configuration information, hence, in step 203, the high layer of the terminal equipment or the access stratum layer of the terminal equipment may determine the mapping according to the service requirements of the V2X services and the configuration information.

In this embodiment, the configuration information may include: SCS configuration information, and/or transmission time length configuration information, and/or BWP configuration information.

The SCS configuration information may include: for more than one frequencies of the V2X services, an SCS set supported on a frequency, and/or a bandwidth where each SCS is located, etc.

The transmission time length configuration information may include: or more than one frequencies of the V2X services, whether slot transmission or non-slot transmission is supported on a frequency, and/or the number of symbols of the non-slot.

The BWP configuration information may include: for more than one frequencies of the V2X services, an identity, and/or an index, and/or a bandwidth, and/or a used SCS, and/or cyclic prefix, and/or PSCCH Configuration, and/or PSSCH configuration, and/or configured grant configuration, and/or beam related configuration, and/or whether slot transmission or non-slot transmission is used, etc., of a BWP on a frequency.

In this embodiment, the terminal equipment may receive the configuration information transmitted by the network device. In another implementation, the terminal equipment may also be pre-configured with the configuration information. Furthermore, the terminal equipment may determine the configuration information according to information provided by the high layer of the terminal equipment, or determine the configuration information according to pre-defined information, or determine the above configuration information according to default configuration information.

The determining the above configuration information according to default configuration information may be that, for example, when the terminal equipment performs side link (SL) data transmission by using an uplink (UL) carrier of LTE or NR, uplink (UL) SCS configuration information and/or transmission time length configuration information and/or BWP configuration information of a serving cell may be applied by default.

In this embodiment, the mapping between the V2X serviced and the communication resource parameters may also be determined by the network device, in which case the terminal equipment may also obtain or select the communication resources in the above first mode or second mode.

Figure 6:
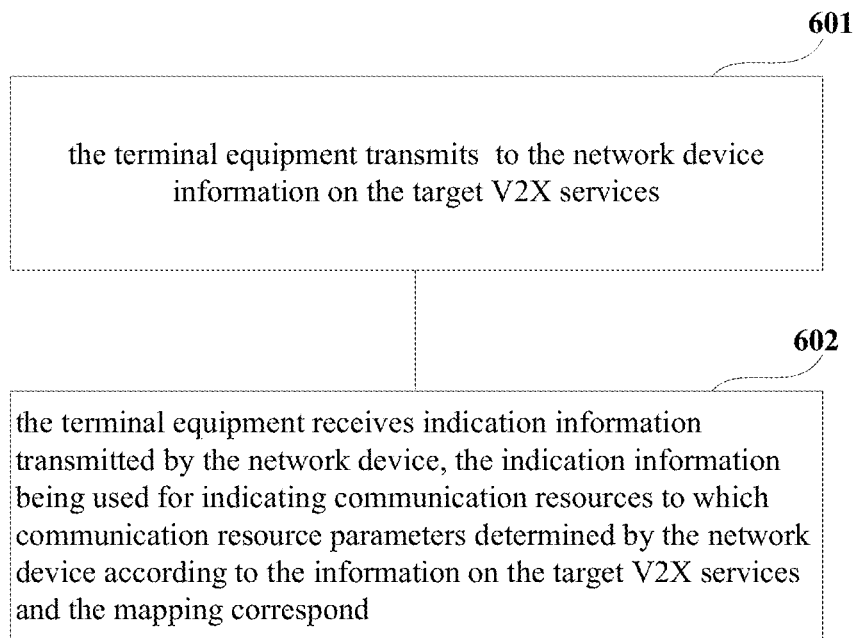
FIG. 6 is another schematic diagram of the method for acquiring communication resources by the terminal equipment in the first mode of Embodiment 1 of this disclosure.

FIG. 6 is another schematic diagram of the method for acquiring communication resources by the terminal equipment in the first mode of this embodiment. As shown in FIG. 6, the method includes:

step 601: the terminal equipment transmits to the network device information on the target V2X services; and step 602: the terminal equipment receives indication information transmitted by the network device, the indication information being used for indicating communication resources to which communication resource parameters determined by the network device according to the information on the target V2X services and the mapping correspond.

Description of step 601 and step 602 is identical to the description of step 402 and step 403, which shall not be described herein any further.

Figure 7:
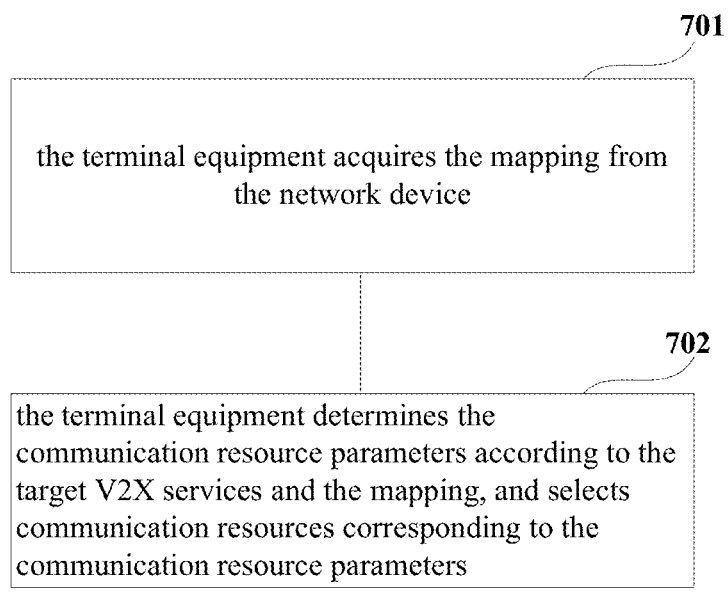
FIG. 7 is another schematic diagram of the method for acquiring communication resources by the terminal equipment in the second mode of Embodiment 1 of this disclosure.

FIG. 7 is a schematic diagram of the method for selecting communication resources by the terminal equipment in the second mode of this embodiment. As shown in FIG. 7, the method includes:

step 701: the terminal equipment acquires the mapping from the network device; and step 702: the terminal equipment determines the communication resource parameters according to the target V2X services and the mapping, and selects communication resources corresponding to the communication resource parameters.

In step 701 of this embodiment, the terminal equipment is, for example, in an in coverage state, hence, it may acquire the mapping from the network device.

The description of step 702 is identical to the description of step 501 above, which shall not be described herein any further.

In this embodiment, in FIG. 7, there may also exist the same step as step 503, that is, the terminal equipment is provided with the information on the communication resource to which each communication resource parameter corresponds, hence, in step 702, the terminal equipment may determine the communication resource parameters according to the target V2X services, the mapping and the communication resource information to which each communication resource parameter corresponds, and select the communication resources corresponding to the communication resource parameters.

In addition, in this embodiment, when the terminal equipment obtains the communication resources in the first mode, as FIG. 4 and FIG. 6, when the determined communication resource parameters are BWP information, the terminal equipment may further receive control information containing an index of the BWP from the network device, the control information being used to activate the BWP on the sidelink (SL). The control information may be downlink control information (DCI), such as DCI 5A.

In addition, in this embodiment, when the terminal equipment selects the communication resources in the second mode, as shown FIG. 5 and FIG. 7, when the communication resource parameters needing to be determined are BWP information, the terminal equipment may determine the BWP information based on the following modes that:

if the terminal equipment is configured with a mapping between V2X services and available BWPs on a sidelink (SL), the terminal equipment determines BWPs taken as the communication resource parameters according to the V2X services and the mapping;

and if the terminal equipment is configured with BWP configuration and a mapping between V2X services and available subcarrier spacings (SCSs) on a sidelink (SL), the terminal equipment determines SCSs according to the V2X services and the mapping, and determines the BWPs taken as the communication resource parameters according to the determined SCSs; or the terminal equipment determines SCSs according to the V2X services and the mapping, selects a transmission pool according to the determined SCSs, and determines BWPs where the transmission pool is located as the BWPs taken as the communication resource parameters.

According to this embodiment, the communication resources of the terminal equipment may be determined according to the mapping between vehicle-to-everything (V2X) services and communication resource parameters, thereby making the communication resources meet requirements of the V2X services.

Embodiment 2

The embodiment of this disclosure provides a communication method, which is carried out by a network device.

Figure 8:
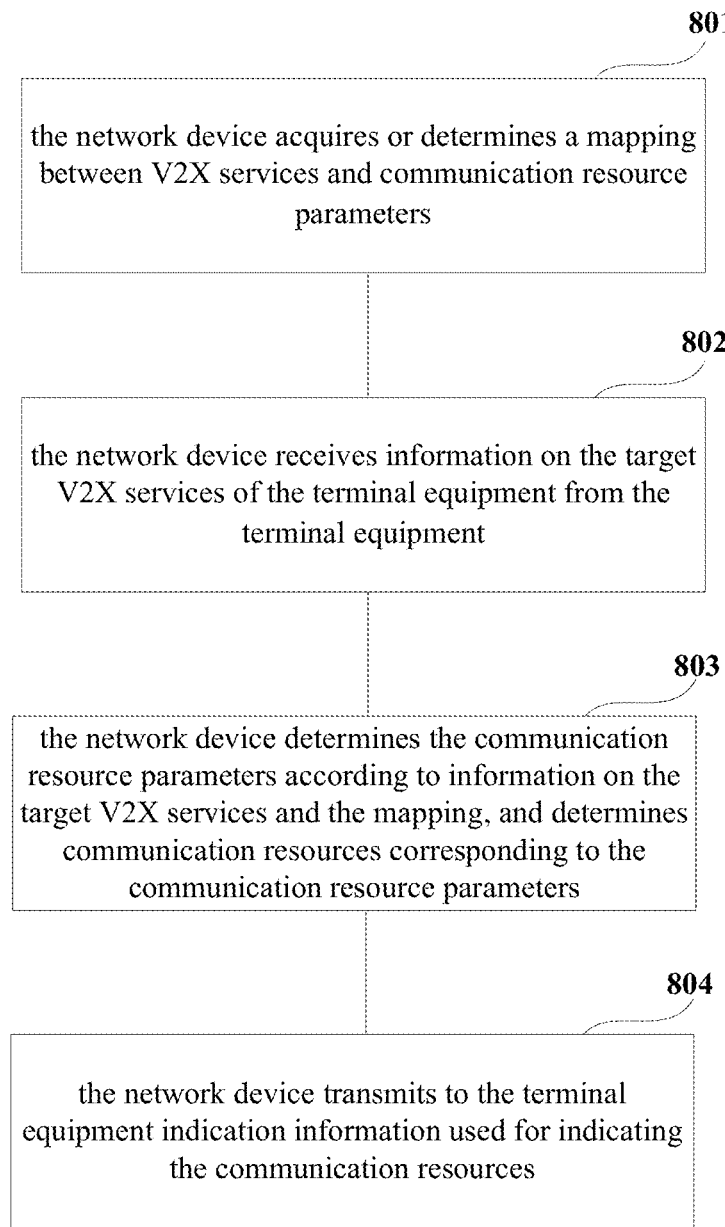
FIG. 8 is a schematic diagram of the communication method of Embodiment 2 of this disclosure.

FIG. 8 is a schematic diagram of the communication method of Embodiment 2 of this disclosure. As shown in FIG. 8, the method includes:

step 801: the network device acquires or determines a mapping between vehicle-to-everything (V2X) services and communication resource parameters.

In step 801 of this disclosure, the network device may receive from the terminal equipment the mapping determined by the terminal equipment. For example, the network device may receive the mapping between V2X services and communication resource parameters from the terminal equipment via a radio resource control (RRC) message. In another implementation, the network device may determine the mapping, for example, the network device may determine the mapping according to service requirements of the V2X services.

In this embodiment, the communication resource parameters include at least one of the following: a subcarrier spacing (SCS), a transmission time length of a transport block, and information on a bandwidth part (BWP).

In this embodiment, the mapping between V2X services and communication resource parameters includes: a mapping between service types of the V2X services and the communication resource parameters, and/or a mapping between service attributes of the V2X services and the communication resource parameters.

In this embodiment, the service types of the V2X services are at least one of the following: safety services or non-safety services, periodic messages or event-triggered messages, and common awareness messages (CAMs) or decentralized environmental notification messages (DENMs) or basic safety messages (BSMs).

In this embodiment, the service attributes of the V2X services are at least one of the following: priorities of the V2X services, reliabilities of the V2X services, latency of the V2X services, and service quality grades of the V2X services.

In this embodiment, as shown in FIG. 8, the method further includes:

step 802: the network device receives information on the target V2X services of the terminal equipment from the terminal equipment;

step 803: the network device determines the communication resource parameters according to information on the target V2X services and the mapping, and determines communication resources corresponding to the communication resource parameters; and step 804: the network device transmits to the terminal equipment indication information used for indicating the communication resources.

With steps 802-804, the terminal equipment is made to obtain the communication resources in a first mode.

Furthermore, in the first mode, when the determined communication resource parameters are BWPs, the network device transmits to the terminal equipment control information containing indices of the BWPs, the control information being used for activating the BWPs on a sidelink (SL).

In this embodiment, the network device may transmit the determined mapping to the terminal equipment, hence, the terminal equipment may select the communication resources in a second mode.

In addition, in the second mode, the network device may also transmit to the terminal equipment information on a communication resource to which each communication resource parameters correspond, hence, the terminal equipment may select the communication resources with reference to the information.

In this embodiment, the network device may also provide configuration information to the terminal equipment, which is used to configure the communication resource parameters, so as to determine the mapping. Thus, the terminal equipment may determine the mapping based on the configuration information of the communication resource parameters.

According to this embodiment, the communication resources of the terminal equipment may be determined according to the mapping between vehicle-to-everything (V2X) services and communication resource parameters, thereby making the communication resources meet requirements of the V2X services.

Embodiment 3

Embodiment 3 of this disclosure provides a communication apparatus, provided in a terminal equipment. As a principle of the apparatus for solving problems is similar to that of the method in Embodiment 1, reference may be made to the implementation of the method in Embodiment 1 for implementation of this apparatus, with identical contents being going to be described herein any further.

Figure 9:
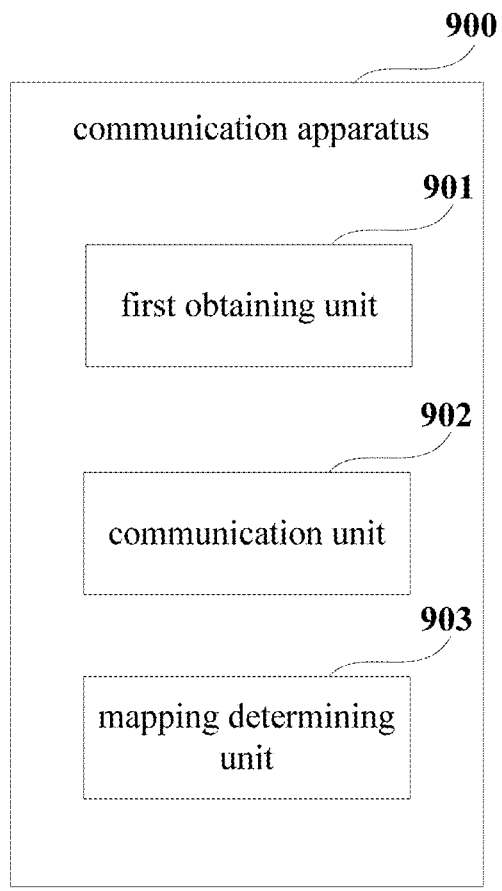
FIG. 9 is a schematic diagram of the communication apparatus of Embodiment 3 of this disclosure.

FIG. 9 is a schematic diagram of the communication apparatus of Embodiment 3 of this disclosure. As shown in FIG. 9, a communication apparatus 900 includes a first obtaining unit 901 and a communication unit 902. The first obtaining unit 901 is configure to acquire or select communication resources determined based on a mapping between vehicle-to-everything (V2X) services and communication resource parameters, and the communication unit 902 is configure to transmit target V2X services by using the communication resources.

In this embodiment, the first obtaining unit 901 may acquire or select the communication resources in a first mode or a second mode.

In this embodiment, the communication resource parameters include at least one of the following: a subcarrier spacing (SCS), a transmission time length of a transport block, and information on a bandwidth part (BWP).

In this embodiment, the mapping between V2X services and communication resource parameters includes: a mapping between service types of the V2X services and the communication resource parameters, and/or a mapping between service attributes of the V2X services and the communication resource parameters.

In this embodiment, the service types of the V2X services are at least one of the following: safety services or non-safety services, periodic messages or event-triggered messages, and common awareness messages (CAMs) or decentralized environmental notification messages (DENMs) or basic safety messages (BSMs).

In this embodiment, the service attributes of the V2X services are at least one of the following: priorities of the V2X services, reliabilities of the V2X services, latency of the V2X services, and service quality grades of the V2X services.

In this embodiment, the mapping between V2X services and communication resource parameters is determined by a high layer of the terminal equipment or an access stratum layer (AS layer) of the terminal equipment.

In this case, the first obtaining unit 901 acquires the communication resources in the first mode, such as transmitting to the network device information on the target V2X services, and receiving indication information transmitted by the network device, the indication information being used for indicating communication resources to which communication resource parameters determined by the network device according to the information on the target V2X services and the mapping correspond.

In this embodiment, the mapping between V2X services and communication resource parameters is transmitted to the network device by the communication apparatus. For example, the mapping between V2X services and communication resource parameters is transmitted via a radio resource control (RRC) message to the network device for transmission.

In this case, the first obtaining unit 901 acquires the communication resources in the second mode, such as determining the communication resource parameters according to the target V2X services and the mapping, and selecting communication resources corresponding to the communication resource parameters.

And furthermore, the first obtaining unit 901 is provided with information on a communication resource to which each communication resource parameter corresponds; wherein the first obtaining unit 901 determines the communication resource parameters according to the target V2X services, the mapping and the information on a communication resource to which each communication resource parameter corresponds, and selects communication resources corresponding to the communication resource parameters.

As shown in FIG. 9, the apparatus 900 further includes: a mapping determining unit 903 configure to control the high layer of the terminal equipment or the access stratum layer of the terminal equipment to determine the mapping according to service requirements of the V2X services.

In this embodiment, the mapping between V2X services and communication resource parameters is determined by the network device.

In this case, the first obtaining unit 901 may acquire the communication resources in the first mode, such as transmitting to the network device information on the target V2X services, and receiving indication information transmitted by the network device, the indication information being used for indicating communication resources to which communication resource parameters determined by the network device according to the information on the target V2X services and the mapping correspond.

Furthermore, the first obtaining unit 901 may acquire the communication resources in the second mode, such as acquiring the mapping from the network device, determining the communication resource parameters according to the target V2X services and the mapping, and selecting communication resources corresponding to the communication resource parameters.

Moreover, when the determined communication resource parameters are BWP information, the communication apparatus further receives control information containing indices of the BWPs from the network device, the control information being used for activating the BWPs on a sidelink (SL).

Furthermore, in the second mode, if the terminal equipment is configured with a mapping between V2X services and available BWPs on a sidelink (SL), the first obtaining unit 901 may determine BWPs taken as the communication resource parameters according to the V2X services and the mapping.

Furthermore, in the second mode, if the terminal equipment is configured with a mapping between V2X services and available subcarrier spacings (SCSs) on a sidelink (SL) and BWP configuration, the first obtaining unit 901 determines SCSs according to the V2X services and the mapping, and determines the BWPs taken as the communication resource parameters according to the determined SCSs; or the first obtaining unit 901 determines SCSs according to the V2X services and the mapping, selects a transmission pool according to the determined SCSs, and determines BWPs where the transmission pool is located as the BWPs taken as the communication resource parameters.

Reference may be made to the description of the steps in Embodiment 1 for operating principles of the units of the communication apparatus 900.

According to this embodiment, the communication resources of the terminal equipment may be determined according to the mapping between vehicle-to-everything (V2X) services and communication resource parameters, thereby making the communication resources meet requirements of the V2X services.

Embodiment 4

Embodiment 4 of this disclosure provides a communication apparatus, provided in a network device. As a principle of the apparatus for solving problems is similar to that of the method in Embodiment 2, reference may be made to the implementation of the method in Embodiment 2 for implementation of this apparatus, with identical contents being going to be described herein any further.

Figure 10:
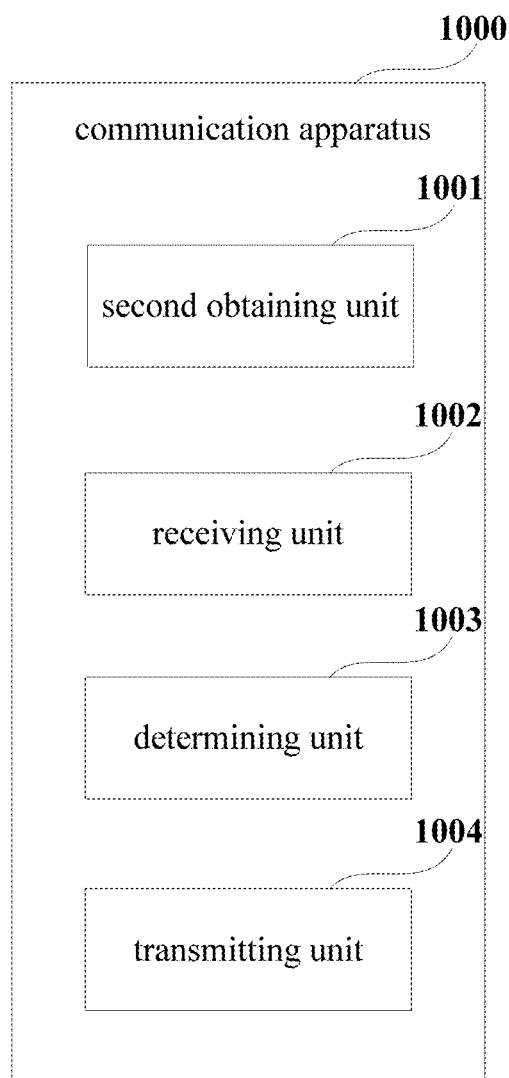
FIG. 10 is a schematic diagram of the communication apparatus of Embodiment 4 of this disclosure.

FIG. 10 is a schematic diagram of the communication apparatus of Embodiment 4 of this disclosure. As shown in FIG. 10, a communication apparatus 1000 includes a second obtaining unit 1001 configure to acquire or determine a mapping between vehicle-to-everything (V2X) services and communication resource parameters.

In this embodiment, the communication resource parameters include at least one of the following: a subcarrier spacing (SCS), a transmission time length of a transport block, and information on a bandwidth part (BWP).

In this embodiment, the mapping between V2X services and communication resource parameters includes: a mapping between service types of the V2X services and the communication resource parameters, and/or a mapping between service attributes of the V2X services and the communication resource parameters.

In this embodiment, the service types of the V2X services are at least one of the following: safety services or non-safety services, periodic messages or event-triggered messages, and common awareness messages (CAMs) or decentralized environmental notification messages (DENMs) or basic safety messages (BSMs).

In this embodiment, the service attributes of the V2X services are at least one of the following: priorities of the V2X services, reliabilities of the V2X services, latency of the V2X services, and service quality grades of the V2X services.

The second obtaining unit 1001 may receive the mapping between V2X services and communication resource parameters from the terminal equipment via a radio resource control (RRC) message, or the second obtaining unit 1001 may determine the mapping.

As shown in FIG. 10, the apparatus 1000 further includes: a receiving unit 1002 configured to receive information on the target V2X services of the terminal equipment from the terminal equipment; a determining unit 1003 configured to determine the communication resource parameters according to information on the target V2X services and the mapping, and determine communication resources corresponding to the communication resource parameters; and a transmitting unit 1004 configured to transmit to the terminal equipment indication information used for indicating the communication resources.

In this embodiment, the communication apparatus 1000 transmits to the terminal equipment information on a communication resource to which each communication resource parameter corresponds.

In this embodiment, the communication apparatus 1000 may further provide configuration information used for determining the mapping to the terminal equipment.

In this embodiment, the communication apparatus 1000 may further transmit the mapping to the terminal equipment.

In this embodiment, when the determined communication resource parameters are BWPs, the transmitting unit 1004 transmits to the terminal equipment control information containing indices of the BWPs, the control information being used for activating the BWPs on a sidelink (SL).

Reference may be made to the description of the steps in Embodiment 2 for the units.

According to this embodiment, the communication resources of the terminal equipment may be determined according to the mapping between vehicle-to-everything (V2X) services and communication resource parameters, thereby making the communication resources meet requirements of the V2X services.

Embodiment 5

Embodiment 5 of this disclosure provides a terminal equipment. As a principle of the terminal equipment for solving problems is similar to that of the method in Embodiment 1, reference may be made to the implementation of the method in Embodiment 1 for implementation of this terminal equipment, with identical contents being going to be described herein any further.

Figure 11:
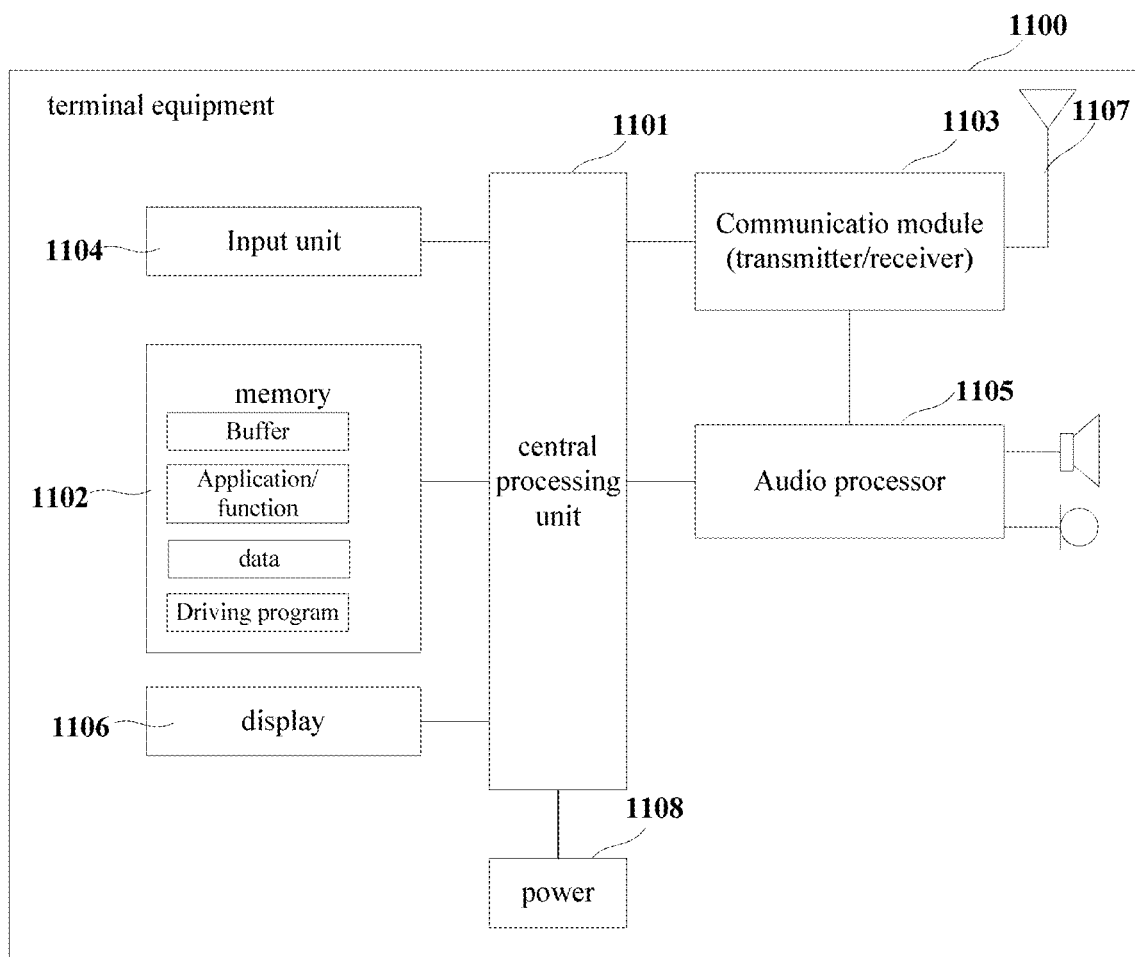
FIG. 11 is a schematic diagram of structure of the terminal equipment of Embodiment 5 of this disclosure.

FIG. 11 is a schematic diagram of a structure of the terminal equipment of the embodiment of this disclosure. As shown in FIG. 11, a terminal equipment 1100 may include a central processing unit (CPU) 1101 and a memory 1102, the memory 1102 being coupled to the central processing unit 1101. The memory 1102 may store various data, and furthermore, it may store a program for data processing, and execute the program under control of the central processing unit 1101, so as to indicate to the terminal equipment according to received signaling.

In one implementation, the functions of the apparatus 900 in Embodiment 3 may be integrated into the central processing unit 1101 of the terminal equipment 1100. The central processing unit 1101 may be configured to carry out the communication method described in Embodiment 1.

For example, the central processing unit 1101 may be configured to perform control, such that the terminal equipment 1100 carries out the method described in Embodiment 1.

Furthermore, reference may be made to Embodiment 1 for other configuration methods of the central processing unit 1101, which shall not be described herein any further.

In another implementation, the apparatus 900 and the central processing unit 1101 may be configured separately; for example, the apparatus 900 may be configured as a chip connected to the central processing unit 1101, such as units shown in FIG. 11, and the functions of the apparatus 900 are executed under control of the central processing unit 1101.

According to this embodiment, the communication resources of the terminal equipment may be determined according to the mapping between vehicle-to-everything (V2X) services and communication resource parameters, thereby making the communication resources meet requirements of the V2X services.

Embodiment 6

Embodiment 6 of this disclosure provides a network device. As a principle of the network device for solving problems is similar to that of the method in Embodiment 2, reference may be made to the implementation of the method in Embodiment 2 for implementation of this network device, with identical contents being going to be described herein any further.

Figure 12:
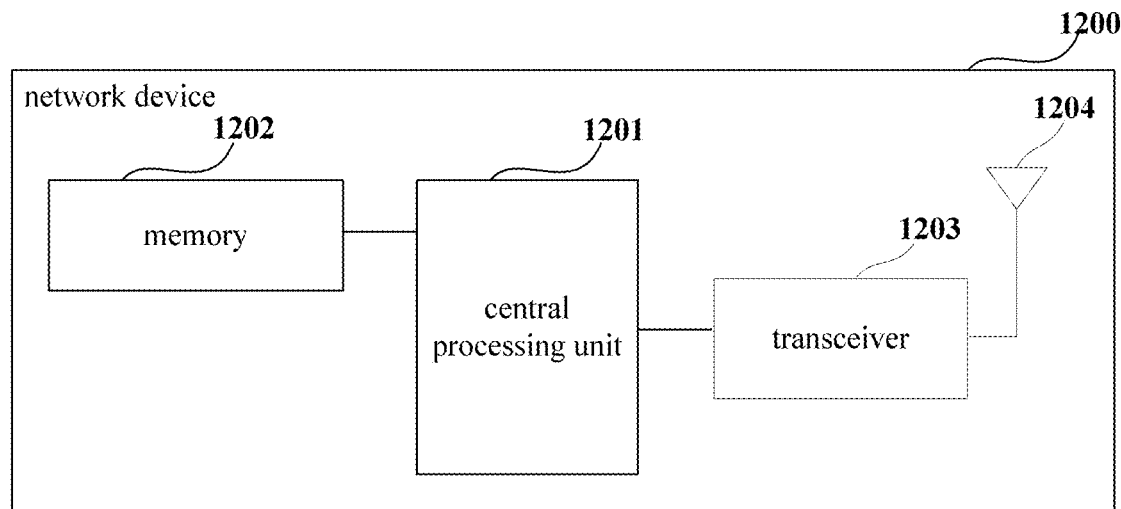
FIG. 12 is a schematic diagram of a structure of the network device of Embodiment 6 of this disclosure.

FIG. 12 is a schematic diagram of a structure of the network device of Embodiment 6 of this disclosure. As shown in FIG. 12, a network device 1200 may include a central processing unit (CPU) 1201 and a memory 1202, the memory 1202 being coupled to the central processing unit 1201. The memory 1202 may store various data, and furthermore, it may store a program for data processing, and execute the program under control of the central processing unit 1201.

In one implementation, the functions of the apparatus 1000 may be integrated into the central processing unit 1201. The central processing unit 1201 may be configured to carry out the communication method described in Embodiment 2.

For example, the central processing unit 1201 may be configured to perform control, such that the network device 1200 carries out the method described in Embodiment 2.

Furthermore, reference may be made to Embodiment 2 for other configuration methods of the central processing unit 1201, which shall not be described herein any further.

In another implementation, the apparatus 1000 and the central processing unit 1201 may be configured separately; for example, the apparatus 1000 may be configured as a chip connected to the central processing unit 1201, such as units shown in FIG. 12, and the functions of the apparatus 1000 are executed under control of the central processing unit 1201.

Furthermore, as shown in FIG. 12, the network device 1200 may include a transceiver 1203, and an antenna 1204, etc. Functions of the above components are similar to those in the related art, and shall not be described herein any further. It should be noted that the network device 1200 does not necessarily include all the parts shown in FIG. 12. Furthermore, the network device 1200 may include parts not shown in FIG. 12, and the related art may be referred to.

According to this embodiment, the communication resources of the terminal equipment may be determined according to the mapping between vehicle-to-everything (V2X) services and communication resource parameters, thereby making the communication resources meet requirements of the V2X services.

Embodiment 7

Embodiment 7 of this disclosure provides a communication system, including at least the terminal equipment 1100 in Embodiment 5 and the network device 1200 in Embodiment 6. Contents of Embodiment 5 and Embodiment 6 are incorporated herein, and shall not be described herein any further.

An operational principle of determining communication resources based on the communication system of this disclosure shall be described below by way of examples.

In the following examples, a communication resource parameter being an SCS is taken as an example, and when the communication resource parameter is another parameter, for example, the communication resource parameter is a transmission time length or BWP information, reference may be made to this example. The terminal equipment 1100 of this disclosure may correspond to UE1 in each example, and the network device 1200 of this disclosure may correspond to a gNB in each example. Furthermore, UE2 in each example may be a terminal equipment that receives V2X service transmitted by UE1 via the determined communication resources.

Figure 13:
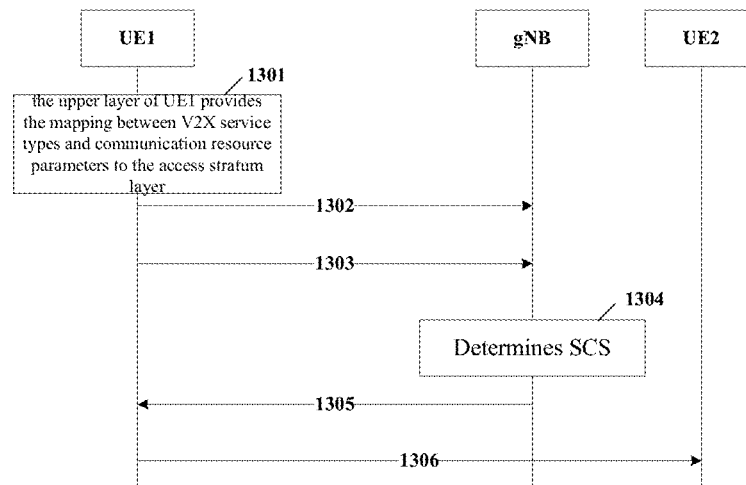
FIGS. 13-19 are workflows of examples of the communication system of Embodiment 7 of this disclosure.

FIG. 13 is a workflow of an example of the communication system of this embodiment. In FIG. 13, a mapping between service types of V2X services and communication resource parameters is provided by an high layer of UE1 to an access stratum layer of UE1, and UE1 obtains the communication resources in a first mode.

As shown in FIG. 13, the workflow is as follows:

1301: the high layer of UE1 provides the mapping between V2X service types and communication resource parameters to the access stratum layer;

1302: UE1 transmits information SidelinkUEInformation to the gNB, the information containing the mapping;

1303: UE1 transmits a Sidelink BSR to the gNB, in which a destination index is contained, destination index being capable of indicating the service types of the target V2X services;

1304: the gNB determines the service types of the target V2X services according to the destination index, and determines the SCS according to the service types of the target V2X services and the mapping;

1305: the gNB transmits indication information to UE1, the indication information being used to indicate a communication resource corresponding to the SCS; and 1306: UE1 transmits the target V2X services to UE2 by using the communication resource.

Figure 14:
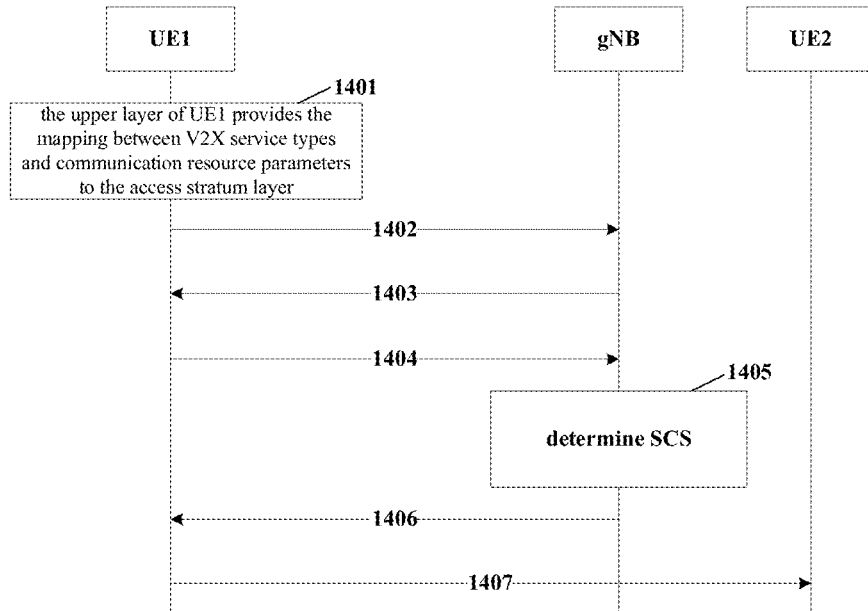

FIG. 14 is a workflow of an example of the communication system of this embodiment. In FIG. 14, a mapping between service attributes of V2X services and communication resource parameters is provided by a high layer of UE1 to an access stratum layer of UE1, and UE1 obtains the communication resources in a first mode.

As shown in FIG. 14, the workflow is as follows:

1401: the high layer of UE1 provides the mapping between V2X service types and communication resource parameters to the access stratum layer;

1402: UE1 transmits information SidelinkUEInformation to the gNB, the information containing the mapping;

1403: the gNB configures a correspondence between logical channel groups (LCGs) and V2X service attributes for UE1;

1404: UE1 transmits a Sidelink BSR to the gNB, in which an identity of a logical channel group is contained;

1405: the gNB determines service attributes of target V2X services according to the identity of the logical channel group, and determines the SCS according to the service attributes of the target V2X services and the mapping; and

1406 and 1407 are respectively identical to 1305 and 1306.

Figure 15:
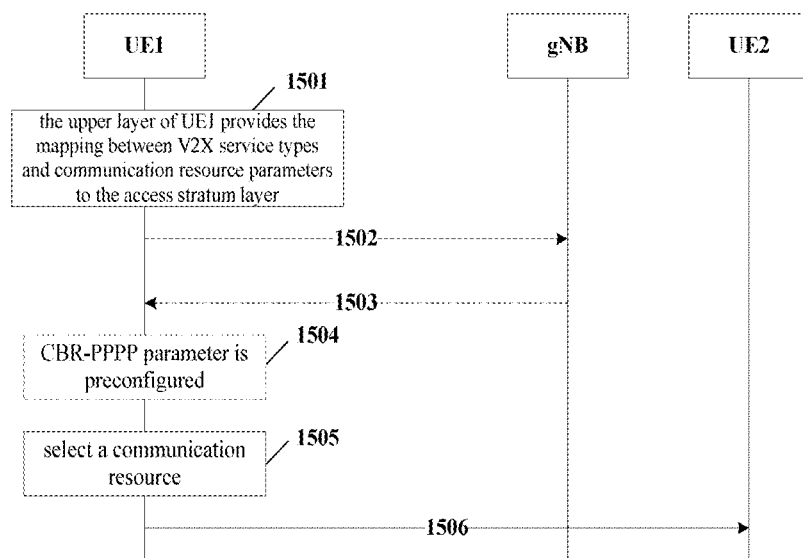

FIG. 15 is a workflow of an example of the communication system of this embodiment. In FIG. 15, a mapping between service types of V2X services and communication resource parameters is provided by a high layer of UE1 to an access stratum layer of UE1, and UE1 selects the communication resources in a second mode.

As shown in FIG. 15, the workflow is as follows:

1501: the high layer of UE1 provides the mapping between V2X service types and communication resource parameters to the access stratum layer;

1502: UE1 transmits information SidelinkUEInformation to the gNB, the information containing the mapping;

1503: the gNB configures UE1 with channel busy ratio (CBR) information and/or priority information of a communication resource to which each SCS corresponds, such as a CBR-PPPP parameter;

1504: UE1 is preconfigured with channel busy ratio (CBR) information and/or priority information of a communication resource to which each SCS corresponds, such as a CBR-PPPP parameter;

1505: UE1 determines SCSs according to the mapping and the service types of the target V2X services, and selects a communication resource according to the CBR-PPPP parameter, by UE1, such as selecting a communication resource to which an SCS corresponds, the SCS corresponding to the PPPP and having a measured CBR value lower than a configured CBR threshold; and

1506: UE1 transmits the target V2X services to UE2 by using the communication resource.

In the example of FIG. 15, steps 1502, 1503 and 1504 are optional, with which the channel busy ratio (CBR) information and/or priority information may be configured for UE1, for example, (1) with steps 1502 and 1503, the gNB configures the CBR-PPPP parameters for UE1; for example, when UE1 is in coverage and in an RRC Connected mode, the SidelinkUEInformation message transmitted by UE1 may include the mapping between V2X service types and SCSs, and the gNB may configure the channel busy ratio (CBR) information and/or priority information of the communication resource to which each SCS corresponds by using an RRC dedicated message, such as a CBR-PPPP parameter.

(2) with step 1503, the gNB configures the CBR-PPPP parameter for UE1; for example, UE1 is in coverage and in an RRC IDLE mode, UE1 does not transmit the SidelinkUEInformation message, and may obtain the channel busy ratio (CBR) information and/or priority information of the communication resource to which each SCS corresponds, such as a CBR-PPPP parameter, from system information;

(3) with step 1504, UE1 is pre-configured with the CBR-PPPP parameter; for example, when UE1 is out of coverage, UE1 obtains the channel busy ratio (CBR) information and/or priority information of the communication resource to which each SCS corresponds, such as a CBR-PPPP parameter, from the pre-configuration.

In addition, 1502, 1503 and 1504 may not exist. Hence, in 1505, UE1 determines the SCSs according to the mapping and the service types of the target V2X services, selects communication resources, and considers the CBR-PPPP parameter no longer.

Figure 16:
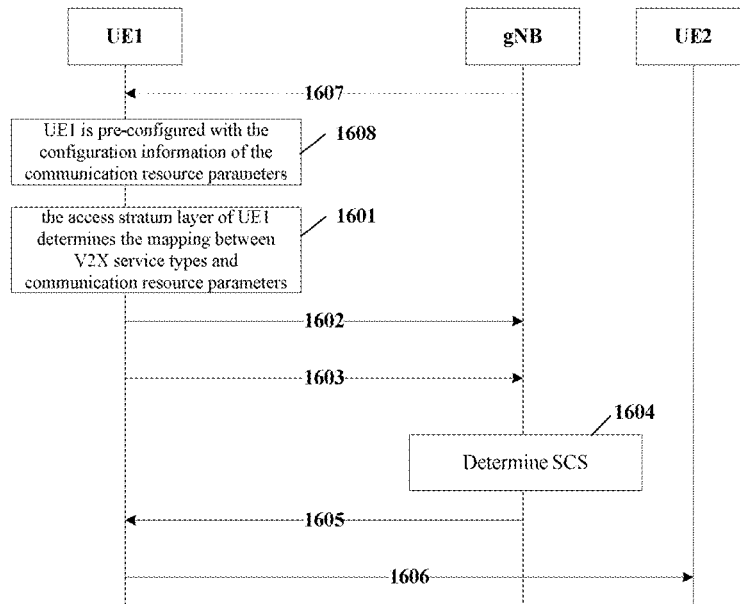

FIG. 16 is a workflow of an example of the communication system of this embodiment. In FIG. 16, a mapping between service types of V2X services and communication resource parameters is determined by an access stratum layer of UE1, and UE1 obtains the communication resources in a first mode.

As shown in FIG. 16, the workflow is as follows:

1601: the access stratum layer of UE1 determines the mapping between V2X service types and communication resource parameters;

1602~1606 are respectively identical to 1302~1306.

As shown in FIG. 16, the workflow may further include:

1607: the gNB provides configuration information of the communication resource parameters, such as SCS configuration information for SL, to UE1;

1608: UE1 is pre-configured with the configuration information of the communication resource parameters.

1607 and 1608 are optional. And the SCS configuration for SL may be configured by the gNB via dedicated signaling or broadcast signaling (as described in 1607), or may also be pre-configured (as described in 1608), or may not be configured, and UE1 selects a default set of SCSs.

Figure 17:
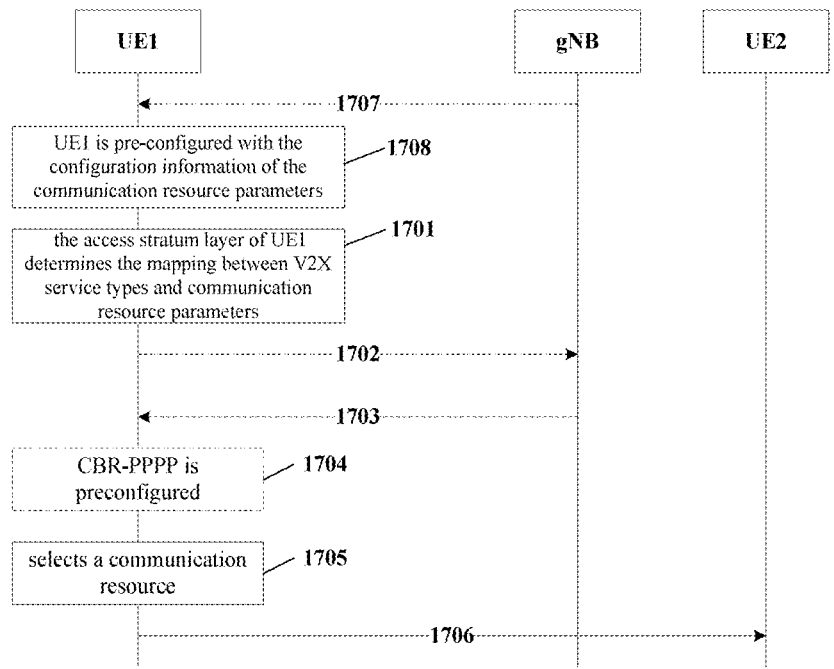

FIG. 17 is a workflow of an example of the communication system of this embodiment. In FIG. 17, a mapping between service types of V2X services and communication resource parameters is determined by an access stratum layer of UE1, and UE1 obtains the communication resources in a second mode.

As shown in FIG. 17, the workflow is as follows:

1701: the access stratum layer of UE1 determines the mapping between V2X service types and communication resource parameters;

1702~1706 are respectively identical to 1502~1506.

As shown in FIGS. 17, 1707 and 1708 are optional, and reference may be made to the description of 1607 and 1608 for description of 1707 and 1708.

Figure 18:
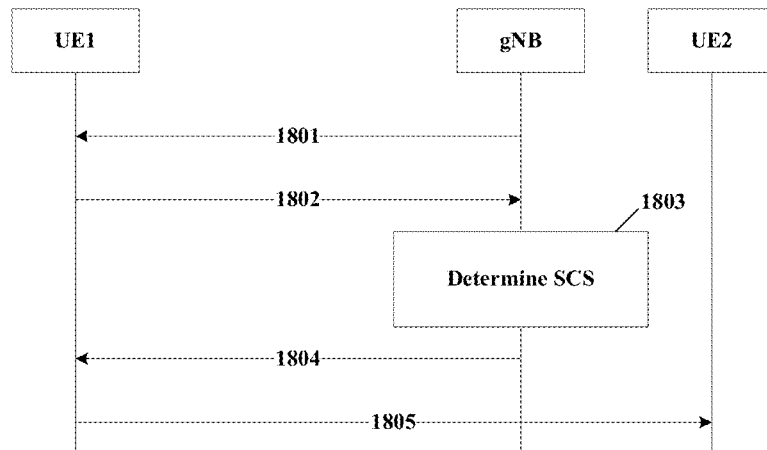

FIG. 18 is a workflow of an example of the communication system of this embodiment. In FIG. 18, the mapping relationship between service attributes of V2X services and communication resource parameters is determined by the gNB, and UE1 obtains the communication resources in a first mode.

As shown in FIG. 18, the workflow is as follows:

1801: the gNB configures a correspondence between a logical channel group (LCG) and V2X service attributes for UE1, this step being identical to 1403 in FIG. 14;

1802: UE1 transmits a Sidelink BSR to gNB, which contains an identity of the logical channel group, this step being identical to 1403 in FIG. 14;

1803: the gNB determines the service attributes of the target V2X services by the gNB according to the identity of the logical channel group, and determines SCSs according to the service attributes of the target V2X services and the mapping, this step being identical to 1405 in FIG. 14;

1804 and 1805 are respectively identical to 1406 and 1407, respectively.

Figure 19:
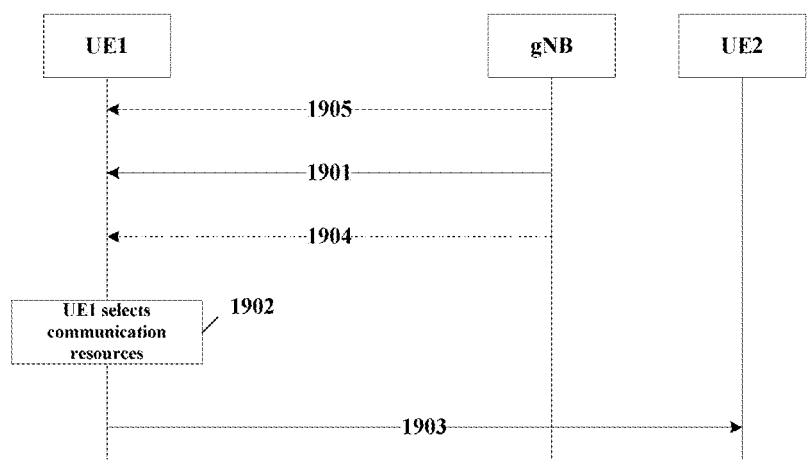

FIG. 19 is a workflow of an example of the communication system of this embodiment. In FIG. 19, the mapping relationship between service attributes of V2X services and communication resource parameters is determined by the gNB, and UE1 obtains the communication resources in a second mode.

As shown in FIG. 19, the workflow is as follows:

1901: the gNB provides the mapping relationship between service attributes and communication resource parameters to the access stratum layer;

1902: UE1 selects communication resources according to the mapping relationship;

1903: UE1 transmits the target V2X services to UE2 by using the communication resources.

Furthermore, FIG. 19 may optionally include 1903 and/or 1904, wherein,

1904: the gNB configures UE1 with channel busy ratio (CBR) information and/or priority information of a communication resource to which each SCS corresponds, such as a CBR-PPPP parameter, this step being identical to 1503 in FIG. 15;

1905: the gNB provides configuration information of the communication resource parameters, such as SCS configuration information for SL, to UE1, this step being identical to 1607 in FIG. 16.

According to this embodiment, the communication resources of the terminal equipment may be determined according to the mapping between vehicle-to-everything (V2X) services and communication resource parameters, thereby making the communication resources meet requirements of the V2X services.

An embodiment of this disclosure provides a computer storage medium, including a computer readable program code, which will cause a communication apparatus or a terminal equipment to carry out the communication method described in Embodiment 1.

An embodiment of the present disclosure provides a computer readable program code, which, when executed in a communication apparatus or a terminal equipment, will cause the communication apparatus or the terminal equipment to carry out the communication method described in Embodiment 1.

An embodiment of this disclosure provides a computer storage medium, including a computer readable program code, which will cause a communication apparatus or a network device to carry out the communication method described in Embodiment 2.

An embodiment of the present disclosure provides a computer readable program code, which, when executed in a communication apparatus or a network device, will cause the communication apparatus or the network device to carry out the communication method described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 9 and 10 may either correspond to software modules of procedures of a computer program, or correspond to hardware modules. Such software modules may respectively correspond to the steps shown in FIGS. 9 and 10. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 9 and 10 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 9 and 10 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Following supplements are further provided in this disclosure.

1. A communication apparatus, provided in a terminal equipment, the communication apparatus including:

a first obtaining unit configure to acquire or select communication resources determined based on a mapping between vehicle-to-everything (V2X) services and communication resource parameters; and a communication unit configure to transmit target V2X services by using the communication resources.

2. The apparatus according to supplement 1, wherein, the communication resource parameters include at least one of the following:

a subcarrier spacing (SCS), a transmission time length of a transport block, and information on a bandwidth part (BWP).

3. The apparatus according to supplement 1, wherein, the mapping between V2X services and communication resource parameters includes:

a mapping between service types of the V2X services and the communication resource parameters, and/or a mapping between service attributes of the V2X services and the communication resource parameters.

4. The apparatus according to supplement 3, wherein, the service types of the V2X services are at least one of the following: safety services or non-safety services, periodic messages or event-triggered messages, and common awareness messages (CAMs) or decentralized environmental notification messages (DENMs) or basic safety messages SMs)

5. The apparatus according to supplement 3, wherein, the service attributes of the V2X services are at least one of the following: priorities of the V2X services, reliabilities of the V2X services, latency of the V2X services, and service quality grades of the V2X services.

6. The apparatus according to any one of supplements 1-5, wherein, the mapping between V2X services and communication resource parameters is determined by a high layer of the terminal equipment or an access stratum layer (AS layer) of the terminal equipment.

7. The apparatus according to supplement 6, wherein the first obtaining unit:

transmits to the network device information on the target V2X services;

and receives indication information transmitted by the network device, the indication information being used for indicating communication resources to which communication resource parameters determined by the network device according to the information on the target V2X services and the mapping correspond.

8. The apparatus according to supplement 6 or 7, wherein the mapping between V2X services and communication resource parameters is transmitted to the network device by the communication apparatus.

9. The apparatus according to supplement 8, wherein, the mapping between V2X services and communication resource parameters is transmitted via a radio resource control (RRC) message to the network device for transmission.

10. The apparatus according to supplement 1 or 6, wherein, the first obtaining unit determines the communication resource parameters according to the target V2X services and the mapping, and selects communication resources corresponding to the communication resource parameters.

11. The apparatus according to supplement 10, wherein the first obtaining unit is further provided with information on a communication resource to which each communication resource parameter corresponds;

and wherein the first obtaining unit determines the communication resource parameters according to the target V2X services, the mapping and the information on a communication resource to which each communication resource parameter corresponds, and selects communication resources corresponding to the communication resource parameters.

12. The apparatus according to supplement 11, wherein the information on a communication resource to which each communication resource parameter corresponds includes at least one piece of the following information:

information on a channel busy ratio (CBR), information on a priority, information on a reliability, information on a rate, information on latency, and information on quality of service (QoS).

13. The apparatus according to any one of supplements 6-12, wherein, the apparatus further includes:

a mapping determining unit configure to control the high layer of the terminal equipment or the access stratum layer of the terminal equipment to determine the mapping according to service requirements of the V2X services.

14. The apparatus according to supplement 13, wherein, the mapping determining unit is provided with configuration information;

and wherein the mapping determining unit controls the high layer of the terminal equipment or the access stratum layer of the terminal equipment to determine the mapping according to service requirements of the V2X services and the configuration information.

15. The apparatus according to any one of supplements 1-5, wherein, the mapping between V2X services and communication resource parameters is determined by the network device.

16. The apparatus according to supplement 15, wherein the first obtaining unit:

transmits to the network device information on the target V2X services;

and receives indication information transmitted by the network device, the indication information being used for indicating communication resources to which communication resource parameters determined by the network device according to the information on the target V2X services and the mapping correspond.

17. The apparatus according to supplement 15, wherein the first obtaining unit:

acquires the mapping from the network device;

and determines the communication resource parameters according to the target V2X services and the mapping, and selects communication resources corresponding to the communication resource parameters.

18. The apparatus according to supplement 7 or 15, wherein, when the determined communication resource parameters are BWP information, the communication apparatus further receives control information containing indices of the BWPs from the network device, the control information being used for activating the BWPs on a sidelink (SL).

19. The apparatus according to supplement 10 or 16, wherein, if the terminal equipment is configured with a mapping between V2X services and available BWPs on a sidelink (SL), the first obtaining unit determines BWPs taken as the communication resource parameters according to the V2X services and the mapping.

20. The apparatus according to supplement 10 or 16, wherein, if the terminal equipment is configured with a mapping between V2X services and available subcarrier spacings (SCSs) on a sidelink (SL) and BWP configuration, the first obtaining unit determines SCSs according to the V2X services and the mapping, and determines the BWPs taken as the communication resource parameters according to the determined SCSs; or the first obtaining unit determines SCSs according to the V2X services and the mapping, selects a transmission pool according to the determined SCSs, and determines BWPs where the transmission pool is located as the BWPs taken as the communication resource parameters.

21. A communication apparatus, provided in a network device, the communication apparatus including:
a second obtaining unit configure to acquire or determine a mapping between vehicle-to-everything (V2X) services and communication resource parameters.

22. The apparatus according to supplement 21, wherein, the communication resource parameters include at least one of the following:
a subcarrier spacing (SCS), a transmission time length of a transport block, and information on a bandwidth part (BWP).

23. The apparatus according to supplement 21, wherein, the mapping between V2X services and communication resource parameters includes:
a mapping between service types of the V2X services and the communication resource parameters, and/or a mapping between service attributes of the V2X services and the communication resource parameters.

24. The apparatus according to supplement 23, wherein, the service types of the V2X services are at least one of the following: safety services or non-safety services, periodic messages or event-triggered messages, and common awareness messages (CAMs) or decentralized environmental notification messages (DENMs) or basic safety messages (BSMs).

25. The apparatus according to supplement 23, wherein, the service attributes of the V2X services are at least one of the following: priorities of the V2X services, reliabilities of the V2X services, latency of the V2X services, and service quality grades of the V2X services.

26. The apparatus according to supplement 21, wherein, the second obtaining unit receives the mapping between V2X services and communication resource parameters from the terminal equipment via a radio resource control (RRC) message.

27. The apparatus according to any one of supplements 21-25, wherein the apparatus further includes:
a receiving unit configured to receive information on the target V2X services of the terminal equipment from the terminal equipment;
a determining unit configured to determine the communication resource parameters according to information on the target V2X services and the mapping, and determine communication resources corresponding to the communication resource parameters; and
a transmitting unit configured to transmit to the terminal equipment indication information used for indicating the communication resources.

28. The apparatus according to supplement 21, wherein, the communication apparatus transmits to the terminal equipment information on a communication resource to which each communication resource parameter corresponds.

29. The apparatus according to supplement 21, wherein, the communication apparatus provides configuration information used for configuring communication resource parameters to the terminal equipment.

30. The apparatus according to supplement 21, wherein the communication apparatus transmits the mapping to the terminal equipment.

31. The apparatus according to supplement 27, wherein, when the determined communication resource parameters are BWPs, the transmitting unit transmits to the terminal equipment control information containing indices of the BWPs, the control information being used for activating the BWPs on a sidelink (SL).

32. A communication system, including a network device and a terminal equipment;

wherein the network device includes the communication apparatus as described in any one of supplements 21-31, and the terminal equipment includes the communication apparatus as described in any one of supplements 1-20.

The invention claimed is:

1. A communication apparatus, provided in a terminal equipment, the communication apparatus comprising:
processor circuitry configured to acquire or select communication resources determined based on a mapping between vehicle-to-everything (V2X) services and communication resource parameters; and
a transmitter configured to transmit target V2X services by using the communication resources,
wherein the mapping between V2X services and communication resource parameters is determined by a high layer of the terminal equipment or an access stratum layer (AS layer) of the terminal equipment, and
the processor circuitry is further configured to:
transmit to the network device information on the target V2X services; and
receive indication information transmitted by the network device, the indication information being used for indicating communication resources to which communication resource parameters determined by the network device according to the information on the target V2X services and the mapping correspond.

2. The apparatus according to claim 1, wherein,
the communication resource parameters comprise at least one of the following:
a subcarrier spacing (SCS), a transmission time length of a transport block, and information on a bandwidth part (BWP).

3. The apparatus according to claim 1, wherein,
the mapping between V2X services and communication resource parameters comprises:
a mapping between service types of the V2X services and the communication resource parameters, and/or a mapping between service attributes of the V2X services and the communication resource parameters.

4. A communication apparatus, provided in a terminal equipment, the communication apparatus comprising:
processor circuitry configured to acquire or select communication resources determined based on a mapping between vehicle-to-everything (V2X) services and communication resource parameters; and
a transmitter configured to transmit target V2X services by using the communication resources,
wherein the mapping between V2X services and communication resource parameters is determined by a high layer of the terminal equipment or an access stratum layer (AS layer) of the terminal equipment, and
the mapping between V2X services and communication resource parameters is transmitted to the network device by the communication apparatus.

5. A communication apparatus, provided in a terminal equipment, the communication apparatus comprising:
processor circuitry configured to acquire or select communication resources determined based on a mapping between vehicle-to-everything (V2X) services and communication resource parameters; and
a transmitter configured to transmit target V2X services by using the communication resources,
wherein the mapping between V2X services and communication resource parameters is determined by a high layer of the terminal equipment or an access stratum layer (AS layer) of the terminal equipment, the processor circuitry determines the communication resource parameters according to the target V2X services and the mapping, and selects communication resources corresponding to the communication resource parameters, the processor circuitry is further provided with information on a communication resource to which each communication resource parameter corresponds, and the processor circuitry determines the communication resource parameters according to the target V2X services, the mapping and the information on a communication resource to which each communication resource parameter corresponds, and selects communication resources corresponding to the communication resource parameters.

6. The apparatus according to claim 5, wherein the information on a communication resource to which each communication resource parameter corresponds comprises at least one piece of the following information:

information on a channel busy ratio (CBR), information on a priority, information on a reliability, information on a rate, information on latency, and information on quality of service (QoS).

7. The apparatus according to claim 5, wherein, the mapping between V2X services and communication resource parameters is determined by the network device.

8. The apparatus according to claim 7, wherein the processor circuitry is further configured to:

acquire the mapping from the network device, determine the communication resource parameters according to the target V2X services and the mapping, and select communication resources corresponding to the communication resource parameters.

9. A communication apparatus, provided in a network device, the communication apparatus comprising:

a memory, and processor circuitry of the network device, wherein the network device is different from a terminal equipment, wherein the processor circuitry of the network device is coupled to the memory and is configured to:

acquire or determine a mapping between vehicle-to-everything (V2X) services and communication resource parameters.

10. The apparatus according to claim 9, wherein, the communication resource parameters comprise at least one of the following:

a subcarrier spacing (SCS), a transmission time length of a transport block, and information on a bandwidth part (BWP).

11. The apparatus according to claim 9, wherein, the mapping between V2X services and communication resource parameters comprises:

a mapping between service types of the V2X services and the communication resource parameters, and/or a mapping between service attributes of the V2X services and the communication resource parameters.

12. The apparatus according to claim 9, wherein, the processor circuitry receives the mapping between V2X services and communication resource parameters from the terminal equipment via a radio resource control (RRC) message.

13. The apparatus according to claim 9, wherein the apparatus further comprises:

a receiver configured to receive information on the target V2X services of the terminal equipment from the terminal equipment; and a transmitter configured to transmit to the terminal equipment indication information used for indicating communication resources, wherein the processor circuitry is further configured to:

determine the communication resource parameters according to information on the target V2X services and the mapping, and determine the communication resources corresponding to the communication resource parameters.

14. The apparatus according to claim 9, wherein, the processor circuitry is further configured to transmit to the terminal equipment information on a communication resource to which each communication resource parameter corresponds.

15. The apparatus according to claim 9, wherein, the processor circuitry is further configured to provide configuration information used for configuring communication resource parameters to the terminal equipment.

16. The apparatus according to claim 9, wherein the processor circuitry is further configured to transmit the mapping to the terminal equipment.

17. A communication system, comprising a network device; and a terminal equipment;

wherein the network device comprises processing circuitry configured to acquire or determine a mapping between vehicle-to-everything (V2X) services and communication resource parameters, and wherein the terminal equipment comprising:

memory and processing circuitry configured to acquire or select communication resources determined based on the mapping between vehicle-to-everything (V2X) services and communication resource parameters; and communication circuitry configured to transmit target V2X services by using the communication resources.

\* \* \* \* \*